Dec. 11, 1923.

W. SCHMID

LINE WINDING MECHANISM

Filed Jan. 17, 1923

Inventor

William Schmid,

By

Attorneys

Dec. 11, 1923.

W. SCHMID

LINE WINDING MECHANISM

Filed Jan. 17, 1923

Inventor
William Schmid,
By
Attorneys

Patented Dec. 11, 1923.

1,476,769

UNITED STATES PATENT OFFICE.

WILLIAM SCHMID, OF COLDWATER, MICHIGAN.

LINE-WINDING MECHANISM.

Application filed January 17, 1923. Serial No. 613,122.

*To all whom it may concern:*

Be it known that I, WILLIAM SCHMID, a citizen of the United States of America, residing at Coldwater, in the county of Branch and State of Michigan, have invented certain new and useful Improvements in Line-Winding Mechanism, of which the following is a specification, reference being had therein to the accompanying drawings.

This invention relates to a line winding mechanism for fishing reels and has special reference to that class of level winding reels wherein a line guide member is supported by the reel and actuated in synchronism with the spool of the reel to travel back and forth in parallelism with the axis of the spool to evenly and uniformly guide a line on the spool when being wound thereon, such line guide placing the line convolutions on the spool approximately in or parallel to cross sectional planes of the spool at a right angle to the axis thereof with such windings compact and substantially alike on the spool.

Instead of winding a line in the above and usual way my invention aims to wind a line on a spool so that some of the line convolutions will be at an angle to other line convolutions and thus prevent one line convolution from interfering with the winding or unwinding of an adjacent line convolution.

It is a well known fact that when reeling in a fish line, it is often wound so tight that a portion of the line will become wedged between another portion of the line, that is, instead of the windings being in their order on the spool one winding will sink between other windings and cause a back lash and entanglements when the line is to be cast from the spool. The usual and well known level line winding mechanism aims to eliminate back lash by evenly placing the windings on the spool, but such mechanism does not prevent one winding from being wound tighter than others or sinking towards the core or arbor of the spool. This is especially true if the catch is large or a heavy sinker or lure is used for the reason that such weight on the line maintains the same taut while being wound on the spool and consequently there is a binding action of the line convolutions which is not desirable when bait casting.

To prevent one line winding from interfering with another on a reel spool my mechanism places windings alternately in straight and angular planes. For instance, there will be one winding or layer of line on the spool having its convolutions in contact in the usual manner and under or above this closely wound line will be windings or layers of coarse or open windings overlying a plurality of the first mentioned windings to prevent the next layer or winding from sinking into or interfering with the first mentioned winding. Such an arrangement of line windings will permit each convolution of the line to freely leave the spool when a line is cast therefrom, as in bait casting, and all of this is accomplished by an article of manufacture which will cause a line guide to traverse a spool at variable speeds, first slow and then fast, relative to constant speed of the spool so that while the line is guided on to the spool it will be laid thereon in such a manner that one part of the line cannot wedge itself into adjacent parts of the line.

The mechanism by which the above results are attained will be hereinafter described by aid of the drawings, wherein Figure 1 is a front elevation of one of my reels, partly broken away and partly in section, illustrating the line guide actuating screw;

Figure 1:
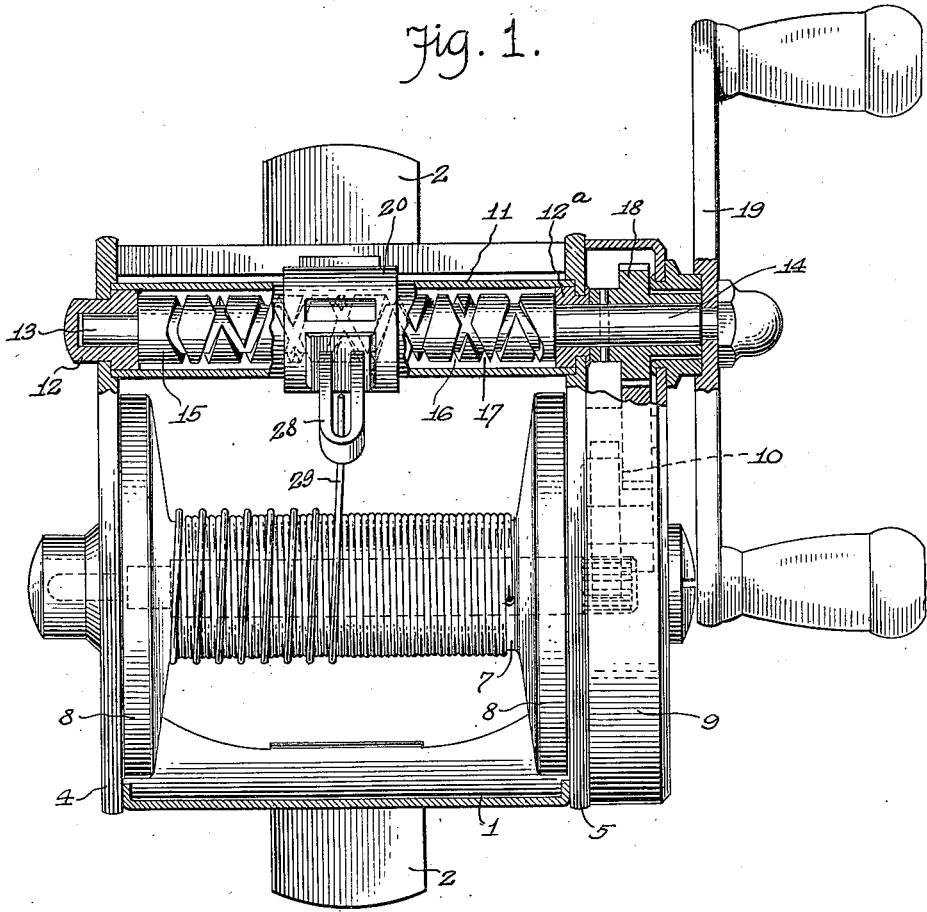
Figure 2:
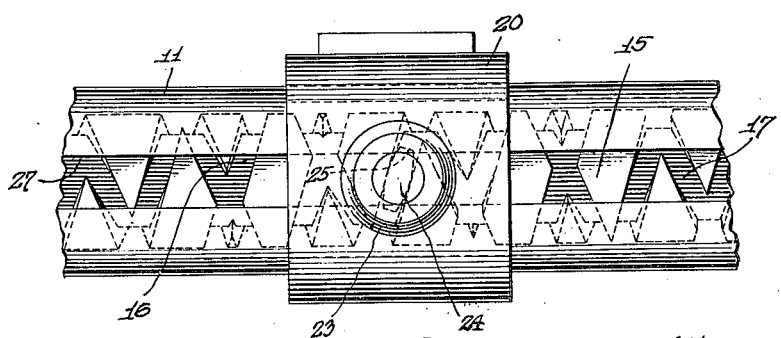
Fig. 2 is an enlarged plan of a portion of the line guide and its actuating screw.
Figure 3:
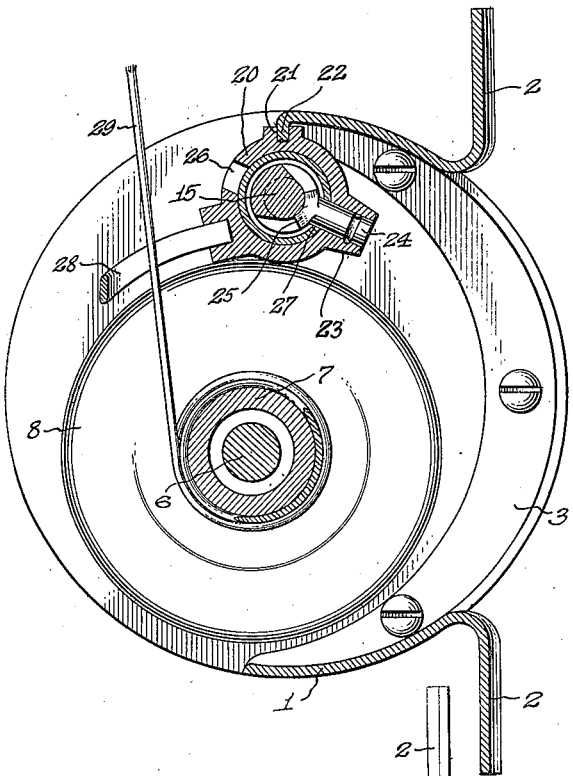
Fig. 3 is a cross sectional view of the reel and the line guide.
Figure 4:
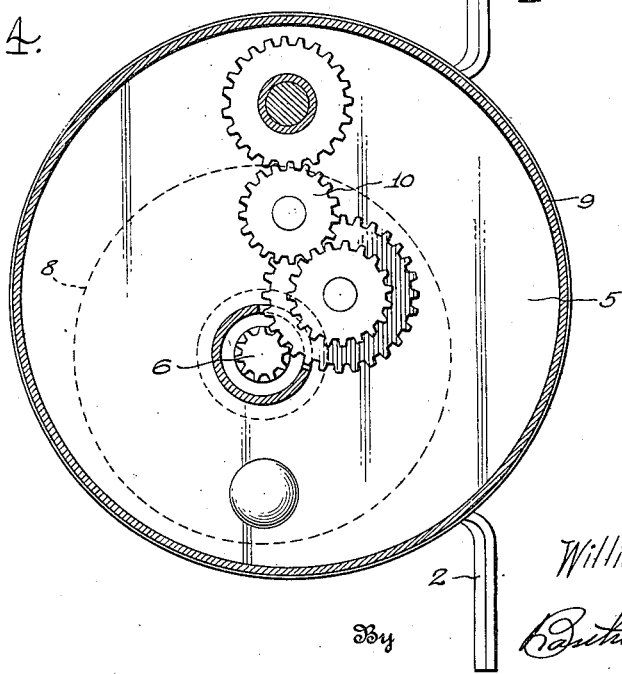
Fig. 4 is a cross sectional view of the gear housing of the reel.

In the drawings, the reference numeral 1 denotes a semi-cylindrical reel frame having longitudinally alining reel seat members 2 adapted to be attached to a fishing rod or other support.

Suitably attached to end flanges 3 of the frame 1 are heads 4 and 5 and suitably journaled in said heads is a spool shaft 6 provided with a spool 7 having end members 8.

Suitably attached to the head 5 is a gear housing 9 containing a train of gears 10 for driving the spool shaft 6 and the spool mounted thereon.

Mounted in the confronting faces of the heads 4 and 5 is a stationary longitudinally slotted sleeve or pillar 11 and mounted in the ends of said sleeve and extending through the heads 4 and 5 are end bearings 12, 12ª for the spindles 13 and 14, respectively, of a screw shaft 15 provided with intersecting threads or grooves 16 and 17.

The spindle 14 of the screw shaft 15 supports a drive gear 18 of the train of gears 10 and a double crank 19 by which the screw shaft 15 and the spool 7 may be operated in synchronism.

Slidable on the stationary sleeve 11 is a traversing or sliding tubular guide head 20 having a groove 21 to receive a rib 22 of the reel frame 1, said rib preventing turning of the traversing guide head during longitudinal movement thereof on the sleeve 11.

At one side of the guide head 20 is a socket 23 for the pin 24 of a follower 25, said follower and pin being insertable through an opening 26 in the guide head 20 with the pin 24 extending through the slot 27 of the sleeve 11. The follower 25 is adapted to engage in the threads 16 and 17 of the screw shaft 15 and cause a traversing movement of the guide head 20, at two speeds, when the screw shaft 15 is revolved.

Protruding from the guide head 20 is a line guide member 28 for a line 29 suitably attached to the spool 7 and adapted to be wound on the spool or cast therefrom.

With the exception of the threads 16 and 17 of the screw shaft 15, I have described one of my reels and as far as this invention is concerned the construction may be of the usual and well known type of level line wind reels, but in this particular instance I reconstruct the screw shaft 15 so that the pitch of the threads 16 will be more acute or different from the pitch of the threads 17, thus causing the line guide to shift in one direction at a greater speed than in the opposite direction, during constant speed of the spool, and a distinct winding advantage is gained by such a variable speed line guide. For instance, with the line guide at one end of the spool or the screw shaft 15 and the line 29 securely attached to the spool 7, the low pitch thread 16 of the screw shaft may cause the line guide to move slowly along the screw shaft and wind or wrap the line 29 on or about the spool 7 with the convolutions closely assembled in intimate contact and substantially in parallel planes approximately at a right angle to the longitudinal axis of the spool. There will be no spaces between the convolutions and the first layer or winding of the line on the spool will be as usually produced by a good level winding mechanism.

After the line guide has reached its limit of slow movement parallel to the spool 7, its direction of movement is reversed at a greater speed by the threads 17, which are of a greater pitch than the threads 16. This will cause the line 29 to be rapidly wound on a spool from one end member thereof to the opposite end member with the line convolutions separated and each convolution crossing a plurality of the first line convolutions placed on the spool. This means that the separated line convolutions will be in planes intersecting or at an angle to the planes of the first mentioned line convolutions, and this second winding constitutes a barrier against a following winding from wedging in, binding on or interfering with the first winding placed on the spool. Picturing the line as completely wound on the spool there will be superposed windings which are alternately composed of closely assembled line convolutions and separated line convolutions, the latter being at an angle to the former. If the line has been wound on the spool while taut or under strain, because of a sinker, lure or fish, the line convolutions are supported in separate and non-interfering windings, so that when the line is again cast from the spool each winding is free to play out without any entanglement, temporary or permanent retardation, causing a back lash and trouble incident thereto.

My invention in its broadest aspect involves means for causing the line guide to traverse the spool at variable speeds with no superposed contacting windings alike, thus avoiding interference between adjacent windings as the line is cast from a spool. I do not care to confine my invention to any particular mechanism other than defined by the appended claims.

What I claim is:—

1. In a line winding mechanism for reels wherein a spool is revolved to cause a line to wind thereon:—line guiding means, said means comprising a reciprocating member actuated in synchronism with the reel spool for causing the line to form in windings on the spool, one winding differing in its angularity from an adjacent winding relative to a plane perpendicular to the spool axis, said windings being formed relative to constant speed of said spool.

2. In a line winding mechanism for reels wherein a spool is revolved to cause a line to wind thereon;—line guiding means, said means comprising a variable speed reciprocatory member actuated in synchronism with the reel spool for causing superposed windings to be placed on the spool with alternate windings of greater pitch than adjoining windings, said variations in the pitch of said windings occurring relative to a constant speed of the spool.

3. As a new article of manufacture, a reel element for causing a line guide to traverse in one direction at a speed different from that of the other direction, comprising a rotary screw having guide traversing threads formed at different pitches to the axis of the screw, said screw threads causing such variations of traverse to occur relative to a constant speed of said rotary screw.

4. A new article of manufacture, as called for in claim 3, wherein said screw has its threads formed by intersecting grooves some of which are more acute than others.

5. As a new article of manufacture, a line guide screw having its periphery formed to cause fast travel of the line guide in one direction and slow travel of the line guide in an opposite direction during constant speed of said screw.

6. The combination of a line holding spool, gearing to facilitate revolving said spool to wind a line thereon, a screw driven from said gearing, and a line guide actuated by said screw to shift back and forth relative to said spool, said screw having threads of different pitches to cause said line guide to travel fast in one direction and slow in the opposite direction.

7. The combination of a line holding spool, a crank driven screw parallel to said spool, means actuated in synchronism with said screw for revolving said spool, and a line guide actuated by said screw to shift back and forth relative to said spool, said screw having threads of different pitches to cause said line guide to travel fast in one direction and slow in the opposite direction.

8. The combination of a reel, a screw operatively related to said reel, and a line guide actuated by said screw to traverse said reel, said screw having threads of different pitches to cause said line guide to travel fast in one direction and slow in the opposite direction.

In testimony whereof I affix my signature in presence of two witnesses.

WILLIAM SCHMID.

Witnesses:
W. H. SIMONS,
KITTIE M. ELIGH.